(12) United States Patent
Park et al.

(10) Patent No.: US 7,517,147 B2
(45) Date of Patent: Apr. 14, 2009

(54) DEVICE AND METHOD FOR MEASURING TEMPERATURE IN A TUBULAR FIXED-BED REACTOR

(75) Inventors: Sung Soo Park, Daejeon (KR); Kyoung Su Ha, Daejeon (KR); Jun Seok Ko, Daejeon (KR); Seong Pil Kang, Daejeon (KR); Se Won Baek, Daejeon (KR); Eun Ju Kim, Daejeon (KR)

(73) Assignee: LG Chem, Ltd. (KR)

( * ) Notice: Subject to any disclaimer, the term of this patent is extended or adjusted under 35 U.S.C. 154(b) by 210 days.

(21) Appl. No.: 11/562,706

(22) Filed: Nov. 22, 2006

(65) Prior Publication Data
US 2007/0116090 A1 May 24, 2007

(30) Foreign Application Priority Data
Nov. 23, 2005 (KR) .................. 10-2005-0112335

(51) Int. Cl.
*G01K 1/14* (2006.01)
(52) U.S. Cl. .................................... 374/208
(58) Field of Classification Search ............ 374/136, 374/54, 112, 137, 166–167, 179, 192, 194, 374/208; D10/51–53, 57, 60; 33/533, 613, 33/645, 520, 644
See application file for complete search history.

(56) References Cited

U.S. PATENT DOCUMENTS

| | | | | |
|---|---|---|---|---|
| 1,641,500 A | * | 9/1927 | Paul | 374/141 |
| 2,660,060 A | * | 11/1953 | Shelton | 374/150 |
| 3,142,979 A | * | 8/1964 | Gewiss et al. | 374/44 |
| 3,263,502 A | * | 8/1966 | Springfield | 136/221 |
| 3,518,884 A | * | 7/1970 | Wood, Jr. | 374/189 |
| 3,537,603 A | * | 11/1970 | Van Den et al. | 414/811 |
| 3,696,916 A | * | 10/1972 | Penniman et al. | 206/212 |
| 4,028,139 A | * | 6/1977 | Smith et al. | 136/230 |
| 4,169,382 A | * | 10/1979 | Goldman et al. | 374/194 |
| 4,218,917 A | * | 8/1980 | Stortz | 374/194 |
| 4,304,177 A | * | 12/1981 | Loeffler et al. | 99/333 |
| 4,336,712 A | * | 6/1982 | Hawkins | 374/138 |
| 4,385,197 A | * | 5/1983 | Schwagerman | 136/221 |

(Continued)

FOREIGN PATENT DOCUMENTS

JP 2001-310114 11/2001

(Continued)

OTHER PUBLICATIONS

PCT International Search Report; Application No. PCT/KR2006/004875; Feb. 6, 2007.

*Primary Examiner*—Patrick J Assouad
*Assistant Examiner*—Bret Adams
(74) *Attorney, Agent, or Firm*—Cantor Colburn LLP

(57) ABSTRACT

Disclosed is a structure for guiding the installation of a thermowell for temperature sensor, which is used to measure the axial temperature inside a fixed-bed catalyst reaction tube when it is filled with a catalyst, at a predetermined location in the reaction tube. In addition, a method for installing a thermowell for temperature sensor is provided. The method includes the steps of installing a structure for guiding the installation of a thermowell for temperature sensor in a reaction tube and fixing the thermowell for temperature sensor while filling the reaction tube with a catalyst.

18 Claims, 5 Drawing Sheets

U.S. PATENT DOCUMENTS

| | | | | |
|---|---|---|---|---|
| 4,412,090 | A * | 10/1983 | Kawate et al. | 136/230 |
| 4,426,569 | A * | 1/1984 | Miller et al. | 392/388 |
| 4,543,059 | A * | 9/1985 | Whang et al. | 432/11 |
| 4,561,312 | A * | 12/1985 | Roy | 73/861.81 |
| 4,627,741 | A * | 12/1986 | Faller | 374/104 |
| 4,653,935 | A * | 3/1987 | Daily et al. | 374/208 |
| 4,707,148 | A * | 11/1987 | Richmond | 374/208 |
| 4,750,357 | A * | 6/1988 | Anderson et al. | 73/195 |
| 4,788,871 | A * | 12/1988 | Nelson et al. | 73/866.5 |
| 4,848,927 | A * | 7/1989 | Daily et al. | 374/208 |
| 4,919,543 | A * | 4/1990 | Davis et al. | 374/139 |
| 4,937,434 | A * | 6/1990 | Nakao | 219/390 |
| 5,074,516 | A * | 12/1991 | Lewis et al. | 248/691 |
| 5,192,132 | A * | 3/1993 | Pelensky | 374/166 |
| 5,257,532 | A * | 11/1993 | Hayakawa et al. | 73/75 |
| 5,509,305 | A * | 4/1996 | Husain et al. | 73/195 |
| 5,771,783 | A * | 6/1998 | Uss | 99/343 |
| 5,857,655 | A * | 1/1999 | Friedrichs | 248/309.1 |
| 6,193,414 | B1 * | 2/2001 | Balzano | 374/208 |
| 6,251,756 | B1 * | 6/2001 | Horzel et al. | 438/510 |
| 6,333,011 | B1 | 12/2001 | Schliephake et al. | |
| 6,402,372 | B1 * | 6/2002 | Saunders | 374/179 |
| 6,530,157 | B1 * | 3/2003 | Henderson et al. | 33/644 |
| 6,669,160 | B2 * | 12/2003 | Steinmetz et al. | 248/346.01 |
| 6,842,994 | B2 * | 1/2005 | McInroy | 33/613 |
| 7,400,975 | B2 * | 7/2008 | Glenn et al. | 702/2 |
| 2002/0182128 | A1 | 12/2002 | Carnahan et al. | |
| 2004/0093753 | A1 * | 5/2004 | McInroy | 33/613 |
| 2004/0221466 | A1 * | 11/2004 | Faubion | 33/645 |

FOREIGN PATENT DOCUMENTS

JP     2002-033134     2/2002

\* cited by examiner

DEVICE AND METHOD FOR MEASURING TEMPERATURE IN A TUBULAR FIXED-BED REACTOR

This application claims the benefit of the filing date of Korean Patent Application No. 10-2005-0112335, filed on Nov. 23, 2005, in the Korean Intellectual Property Office, the disclosure of which is incorporated herein in its entirety by reference.

BACKGROUND OF THE INVENTION (a) Field of the Invention

The present invention relates to a structure for guiding the installation of a thermowell for temperature sensor and a method for installing a thermowell for temperature sensor by using the structure.

(b) Description of the Related Art

In general, the catalytic gas phase oxidation occurring in a reaction tube is highly exothermic, and it is very important to monitor the temperature of the catalyst bed accurately and control the reaction temperature accordingly. Typical examples of such a manufacturing process include a process for manufacturing acrolein or acrylic acid by oxidizing propylene or propane, a process for manufacturing phthalic anhydride by oxidizing naphthalene or orthoxylene, and a process for manufacturing maleic anhydride by partially oxidizing benzene, butylene, or butadiene.

During such a manufacturing process, the temperature is measured in the axial direction of the reaction tube, and is referred to as an axial temperature profile. When it comes to the temperature profile, the location of hot spots and the temperature size at that location vary depending on the construction and activity of the catalyst bed, the reaction temperature, the reaction pressure, and the flow rate of reaction mixtures. Therefore, it is of crucial importance to measure the temperature inside the catalyst bed accurately.

Based on the measured temperature, any excessive increase of temperature at the hot spots inside the catalyst bed or thermal accumulation near the hot spots must be avoided. This is because the high temperature occurring otherwise degrades the selectivity of the product.

In order to monitor the temperature of hot spots of a fixed-bed catalyst reaction tube and obtain a temperature profile of the entire catalyst bed, a thermowell for temperature sensor is installed, and a thermocouple, for example, is placed inside the thermowell while filling the reaction tube with a catalyst.

When a thermowell for temperature sensor is to be positioned at a desired location on a catalyst bed (e.g. at radial center), it is customary to install fixed supports (e.g. wires) on the thermowell at an interval in the axial direction.

However, if a reaction tube is filled with a catalyst while a thermowell for temperature sensor is positioned in the reaction tube by fixed supports, they interfere with the filling path and result in irregular filling. As a result, the density of the catalyst bed fluctuates. In addition, the coefficient of thermal transfer may vary due to the influence of materials constituting the supports. This adversely affects the temperature measurement.

Particularly, if the porosity of the catalyst bed increases locally, most reaction substances tend to pass through the highly porous portion (i.e. channeling occurs). In the case of a heat exchange-type multi-tubular reactor, an enormous load is concentrated on a fraction of contact tubes among tens of thousands of them. For these reasons, it is of great importance to maintain a uniformly filled bed.

When the catalyst needs replacement when its life has expired or when it has been damaged, the supports installed on the thermowell for temperature sensor make it difficult to remove the catalyst from the contact tubes.

A thermowell for temperature sensor having no support may be used in order to avoid these problems. Although this approach may alleviate the irregularity of filling and the deviation of density of the catalyst bed, it becomes difficult to maintain the thermowell for temperature sensor at a desired location in the radial direction of the catalyst bed. Particularly, the thermowell for temperature sensor tends to bend and adhere to the wall of the reaction tube or deflect in an unwanted direction. As a result, it is not easy to measure the temperature at a desired location.

SUMMARY OF THE INVENTION

Therefore, the present invention has been made in view of the above-mentioned problems, and it is an object of the present invention to provide a structure for guiding the installation of a thermowell for temperature sensor so that, when a fixed-bed catalyst reaction tube is filled with a catalyst, the thermowell for temperature sensor is fixed at a predetermined location inside the reaction tube, the resulting catalyst bed has a constant density, the axial temperature profile of the catalyst bed can be measured efficiently, and the height of the catalyst-filled bed can be measured simultaneously.

It is another object of the present invention to provide a holding structure for holding a structure for guiding the installation of a thermowell for temperature sensor.

It is still another object of the present invention to provide a method for installing a thermowell for temperature sensor, together with catalyst filling, by using a structure for guiding the installation of the thermowell for temperature sensor.

According to an aspect of the present invention, there is provided a structure for guiding installation of a thermowell for temperature sensor, the structure including a guide tube for fixing a location of the thermowell; at least two guide tube legs connected to the guide tube in a horizontal direction so as to support the guide tube; and support rods connected to the guide tube legs in a vertical direction so as to support the guide tube legs, respectively.

According to another aspect of the present invention, there is provided a structure for guiding installation of a thermowell for temperature sensor, the structure including a guide tube for fixing a location of the thermowell; at least two guide tube legs connected to the guide tube in a horizontal direction so as to support the guide tube; a ring connected to the guide tube legs in the horizontal direction so as to support the guide tube legs; and at least two support rods connected to the guide tube legs or the ring in a vertical direction so as to support the guide tube legs or the ring.

According to another aspect of the present invention, there is provided a holding structure including a holding ring fastened beneath the guide tube legs or the support rods of the inventive structure for guiding installation of a thermowell for temperature sensor so as to hold the structure; and at least three holding feet connected to the holding ring in a vertical direction so as to support the holding ring.

According to another aspect of the present invention, there is provided a method for installing a thermowell for temperature sensor, the method including the steps of (a) installing a guide structure, the guide structure guiding installation of a thermowell for temperature sensor, inside a reaction tube so that the thermowell for axial temperature measurement is fixed at a predetermined location inside the reaction tube and (b) fixing the thermowell for temperature sensor while filling the reaction tube with a catalyst.

According to another aspect of the present invention, there is provided a method for measuring a height of a filled bed, the method including the steps of (a) installing the inventive structure for guiding installation of a thermowell for temperature sensor in a reaction tube and (b) moving the structure in an axial direction of the reaction tube according to a height of a filled bed while filling the reaction tube with a catalyst so as to measure the height of the filled bed.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE INVENTION

Reference will now be made in detail to the preferred embodiments of the present invention.

The present invention is directed to a structure for guiding the installation of a thermowell for temperature sensor so that the thermowell, which is used to measure the temperature of a catalyst bed in the axial direction inside a reaction tube filled with a fixed-bed catalyst, is fixed at a predetermined location inside the reaction tube.

The structure for guiding the installation of a thermowell for temperature sensor according to the present invention can be moved in the axial direction of the fixed-bed catalyst reaction tube. Such an axial movement is possible not only when the reaction tube is empty, but also while the reaction tube is filled with a catalyst.

When the inventive structure for guiding the installation of a thermowell for temperature sensor is used while the reaction tube is filled with a catalyst, the structure is moved in response to a change in height of the catalyst bed and instantly informs of the filling level.

Figure 1:
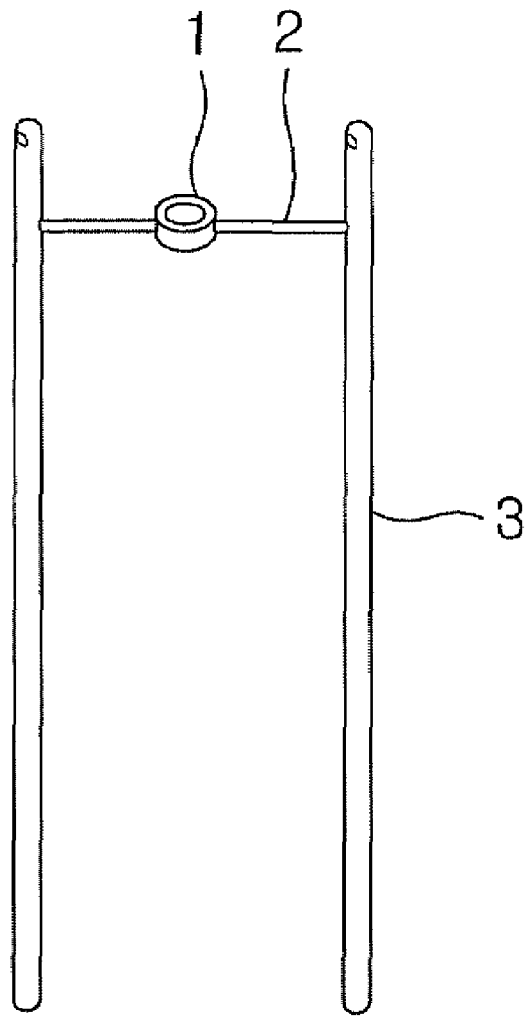
FIG. 1 is a perspective view showing an example of a structure for guiding the installation of a thermowell for temperature sensor according to the present invention.

FIG. 1 shows an example of a structure for guiding the installation of a thermowell for temperature sensor according to the present invention. The structure includes a guide tube 1 for fixing the location of a thermowell, at least two guide tube legs 2 connected to the guide tube in the horizontal (transverse) direction so as to support the guide tube 1, and support rods 3 connected to the guide tube legs in the vertical (longitudinal) direction so as to support them, respectively.

When the structure is installed in a fixed-bed catalyst reaction tube, the thermowell for temperature sensor is made to pass through the guide tube 1 so that the location of the thermowell is fixed.

Wires, for example, may be inserted into holes on the upper end of the support rods 3 so that the structure can be moved in the axial direction by manipulating the wires from the outside of the reaction tube.

The structure may have at least two guide tubes 1 so that the location of the thermowell for temperature sensor can be fixed more securely.

When at least two guide tubes 1 are used, they are preferably placed one above the other at the same radial location from the center of the fixed-bed catalyst reaction tube so that the thermowell for temperature sensor remains fixed in the same axial direction as the reaction tube without being slanted in the reaction tube.

Figure 2:
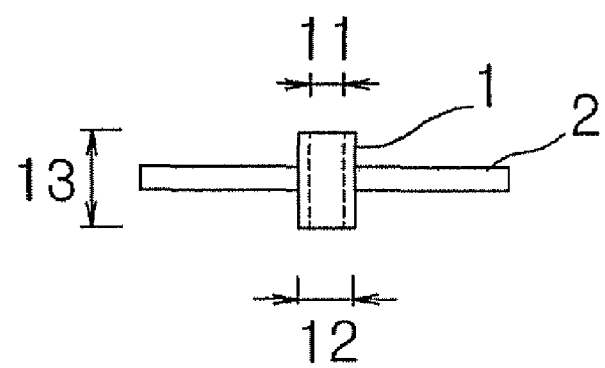
FIG. 2 is a sectional view of a guide tube and a guide tube leg of the structure shown in FIG. 1.

FIG. 2 is a sectional view of the guide tube 1 and the guide tube legs 2 of the structure shown in FIG. 1. The inner diameter 11 of the guide tube 1 is preferably as large as 1.01~2 times the outer diameter of the thermowell, in order to facilitate movement between the structure and the thermowell. The outer diameter 12 of the guide tube 1 is not limited to a specific amount, but preferably has a moderate size for easy catalyst filling. The height 13 of the guide tube 1 may be as large as 0.1~300 times the outer diameter of the thermowell, in order to fix the location of the thermowell. The shape of the guide tube 1 according to the present invention includes not only a tube, but also a ring.

The length and thickness of the guide tube legs 2 have no specific limitation and can be adjusted as desired. However, the length of the guide tube legs 2 is preferably adjusted so that, on the same plane, the guide tube and the guide tube legs conform to the inner diameter of the reaction tube.

The thickness of the support rods 3 is not limited to a specific amount, but, considering catalyst filling, the thickness is preferably not too large.

Figure 3:
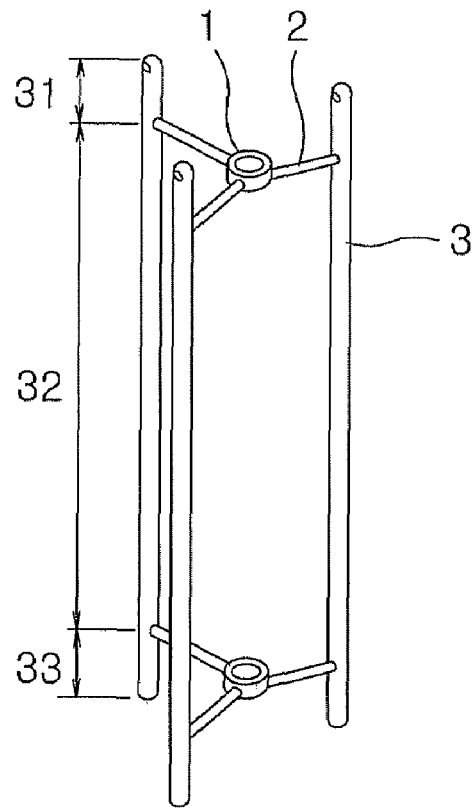
FIG. 3 is a perspective view showing another example of a structure for guiding the installation of a thermowell for temperature sensor according to the present invention.

FIG. 3 shows an example of a structure for guiding the installation of a thermowell for temperature sensor. The structure includes two guide tubes 1 for fixing the location of a thermowell for temperature sensor, six guide tube legs 2 connected to the guide tubes in the horizontal (transverse) direction so as to support them, respectively, (three guide tube legs are connected to each guide tube), and three support rods 3 connected to the guide tube legs 2 in the vertical (longitudinal) direction so as to support them, respectively (each support rod is connected to two guide tube legs arranged one above the other in the axial direction).

When at least two guide tubes 1 are used in the structure, the same number of guide tube legs 2 are preferably connected to each guide tube, considering the connection between the guide tube legs 2 and the support rods 3. The total number of the support rods 3 is preferably equal to the number of guide tube legs 2 connected to each guide tube 1. Respective support rods 3 may be connected to guide tube legs 2 arranged at the highest to the lowest location in the axial direction.

Referring to FIG. 3, when at least two guide tubes 1 are used in the structure, each support rod 3 may include a support rod ear 31 extending from its upper end to a portion connected to the highest guide tube leg, a support rod body 32 extending from the portion connected to the highest guide tube leg to a portion connected to the lowest guide tube leg, and a support rod foot 33 extending from the portion connected to the lowest guide tube leg to the lower end.

The length of the support rod body 32 is not limited to a specific amount, but is preferably as large as 1~30 times the inner diameter of the fixed-bed catalyst reaction tube, in order to fix the location of the thermowell for temperature sensor more efficiently and secure structural stability of the structure itself.

The length of the support rod ear 31 may correspond to 0.1~50% of that of the support rod body 32. The support rod ear 31 may have a hole, into which a wire, for example, is inserted so that, by manipulating the wire from the outside of the reaction tube, the structure can be easily moved in the axial direction.

The length of the support rod foot 33 may correspond to 0.1~50% of that of the support rod body 32. The support rod foot 33 makes it easy to remove the structure from the catalyst bed.

Figure 4:
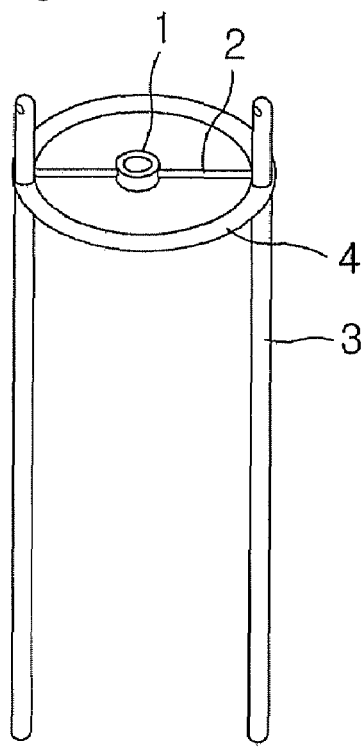
FIG. 4 is a perspective view showing an example of a structure, which includes a ring, for guiding the installation of a thermowell for temperature sensor according to the present invention.

FIG. 4 shows an example of a structure for guiding the installation of a thermowell for temperature sensor. The structure includes a guide tube 1 for fixing the location of a thermowell; at least two guide tube legs 2 connected to the guide tube 1 in the horizontal (transverse) direction so as to support it; a ring 4 connected to the guide tube legs 2 in the horizontal direction so as to support them; and at least two support rods 3 connected to the guide tube legs 2 or the ring 4 in the vertical (longitudinal) direction so as to support the guide tube legs 2 or the ring 4.

Wires, for example, may be inserted into holes on the upper end of the support rods 3 so that the structure can be moved in the axial direction by manipulating the wires from the outside of the reaction tube.

The structure, which includes a ring 4, may have at least two guide tubes 1 so that the location of the thermowell for temperature sensor can be fixed more securely.

When at least two guide tubes 1 are used, they are preferably placed one above the other at the same radial location from the center of the fixed-bed catalyst reaction tube so that the thermowell for temperature sensor remains fixed in the same axial direction as the reaction tube without being slanted in the reaction tube.

Figure 5:
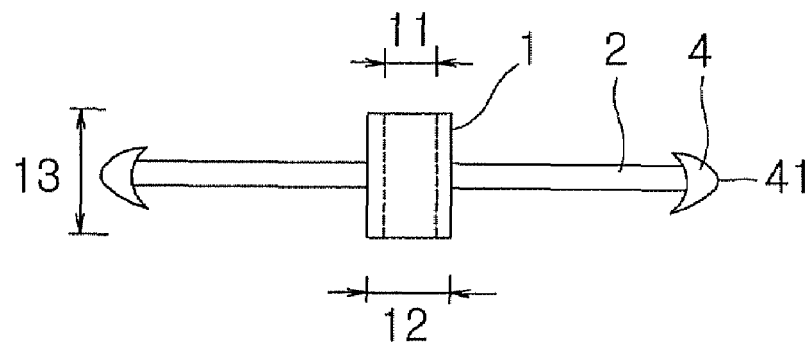
FIG. 5 is a sectional view of a guide tube, a guide tube leg, and the ring of the structure shown in FIG. 4.

FIG. 5 is a sectional view of the guide tube 1, the guide tube legs 2, and the ring 4 of the structure shown in FIG. 4. The inner diameter 11 of the guide tube 1 is preferably as large as 1.01~2 times the outer diameter of the thermowell, in order to facilitate movement between the structure and the thermowell. The outer diameter 12 of the guide tube 1 is not limited to a specific amount, but preferably has a moderate size for easy catalyst filling. The height 13 of the guide tube 1 may be as large as 0.1~300 times the outer diameter of the thermowell, in order to fix the location of the thermowell. The shape of the guide tube 1 according to the present invention includes not only a tube, but also a ring.

The length and thickness of the guide tube legs 2 have no specific limitation and can be adjusted as desired. However, the length of the guide tube legs 2 is preferably adjusted so that, on the same plane, the guide tube and the guide tube legs conform to the inner diameter of the reaction tube.

The diameter and thickness of the ring 4 are not limited to a specific amount, but the maximum diameter of the ring 4 must be smaller than the inner diameter of the reaction tube so that the structure can enter the reaction tube.

There is no specific restriction regarding the shape of the ring 4. As non-limiting examples, the ring 4 may have the shape of a circle, an ellipse, or a polygon having n angles (n: 3~12). The outer portion of the ring 4, i.e. its shell 41, preferably has the shape of a circle, an ellipse, or a polygon having n angles (n: 3~12) so as to reduce the contact area between the ring and the inner wall of the reaction tube.

The thickness of the support rods 3 is not limited to a specific amount, but, considering catalyst filling, the thickness is preferably not too large.

Figure 6:
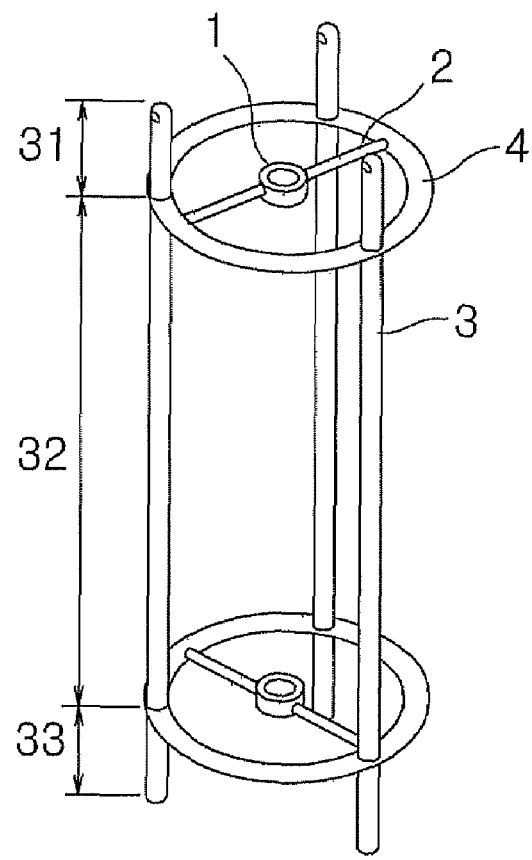
FIG. 6 is a perspective view showing another example of a structure, which includes a ring, for guiding the installation of a thermowell for temperature sensor according to the present invention.

FIG. 6 shows an example of a structure, which includes a ring, for guiding the installation of a thermowell for temperature sensor according to the present invention. The structure includes two guide tubes 1 for fixing the location of a thermowell for temperature sensor; four guide tube legs 2 connected to the guide tubes 1 in the horizontal (transverse) direction so as to support them, respectively, (two guide tube legs are connected to each guide tube); two rings 4 connected to the guide tube legs 2 in the horizontal direction so as to support them, respectively; and three support rods 3 connected to the guide tube legs 2 (each support rod is connected to two guide tube legs arranged one above the other in the axial direction) or to the rings 4 in the vertical (longitudinal) direction so as to support them, respectively.

When at least two guide tubes 1 are used in the structure, the support rods 3 may be connected to the rings 4. Considering this, the number of guide tube legs 2 is not necessarily the same for each guide tube. In addition, the total number of the support rods 3 needs not be identical to the number of guide tube legs 2 connected to each guide tube 1.

When at least two guide tubes 1 are used, the number of the rings 4 is not necessarily identical to the total number of the guide tubes 1. However, when at least two rings 4 are employed, the size of the rings 4 preferably varies to a lesser degree so that the reaction tube can be easily filled with a catalyst. Particularly, the ratio of the outer diameter of the highest ring to that of the lowest ring is preferably 0.8~1.25 or 4/5~5/4.

When at least two guide tubes 1 exist, respective support rods 3 may be connected to guide tube legs 2, which are arranged at the highest to the lowest location in the axial direction, or to the rings 4.

Referring to FIG. 6, when at least two guide tubes 1 are used in the structure, each support rod 3 may include a support rod ear 31 extending from its upper end to a portion connected to the highest guide tube leg or ring, a support rod body 32 extending from the portion connected to the highest guide tube leg or ring to a portion connected to the lowest guide tube leg or ring, and a support rod foot 33 extending from the portion connected to the lowest guide tube leg or ring to the lower end.

The length of the support rod body 32 is not limited to a specific amount, but is preferably as large as 1~30 times the inner diameter of the fixed-bed catalyst reaction tube, in order to fix the location of the thermowell for temperature sensor more efficiently and secure structural stability of the structure itself.

The length of the support rod ear 31 may correspond to 0.1~50% of that of the support rod body 32. The support rod ear 31 may have a hole, into which a wire, for example, is inserted into the hole so that, by manipulating the wire from the outside of the reaction tube, the structure can be easily moved in the axial direction.

The length of the support rod foot 33 may correspond to 0.1~50% of that of the support rod body 32. The support rod foot 33 makes it easy to remove the structure from the catalyst bed.

The angle between guide tube legs on different planes (i.e. angle between upper and lower guide tube legs) is not limited specifically, and may be 0~180°.

In order to improve the strength of the guide tube 1 and the guide tube legs 2 of the structure for guiding the installation of a thermowell for temperature sensor according to the present invention, they may be made of at least one material selected from the group consisting of nickel, copper, aluminum, titanium, chromium, carbon, iron, cobalt, molybdenum, gold, silver, vanadium, stainless steel, and an alloy thereof. The support rods 3 and the rings 4, which make contact with the reaction tube, are preferably made of a material capable of reducing the friction against the inner wall of the reaction tube, such as Teflon or engineering plastic. If higher hardness is necessary, a material containing more carbon is used. Likewise, if high-temperature hardness and resistance to corrosion need to be increased, chromium is added. If toughness and resistance to corrosion need to be improved, more nickel is used.

A holding structure according to the present invention includes a holding ring fastened beneath the guide tube leg or support rod of the above-mentioned structure for guiding the installation of a thermowell for temperature sensor so as to hold the guide structure; and at least three holding feet connected to the holding ring in the vertical direction so as to support it.

Figure 7:
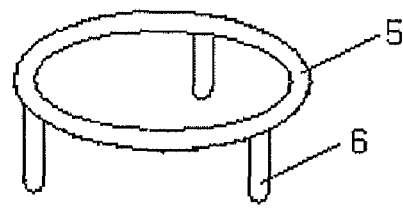
FIG. 7 is a perspective view showing an example of a holding structure for holding a structure for guiding the installation of a thermowell for temperature sensor according to the present invention.

FIG. 7 shows an example of a holding structure according to the present invention, which is adapted to hold the guide structure.

The thickness of the holding ring 5 of the holding structure is not limited to a specific amount. The maximum diameter of the holding ring 5 must be smaller than the inner diameter of the reaction tube, but larger than the outer diameter of the thermowell for temperature sensor. Preferably, the maximum diameter of the holding ring 5 is smaller than or equal to the horizontal maximum diameter of the guide structure. In addition, the size of the holding ring 5 must be determined so that it can move in both directions inside the reaction tube and lift the structure while sustaining it from below.

There is no specific restriction regarding the shape of the holding ring 5. As non-limiting examples, the holding ring 5 may have the shape of a circle, an ellipse, or a polygon having n angles (n: 3~12). The outer portion of the holding ring 5, i.e. its shell, preferably has the shape of a circle, an ellipse, or a polygon having n angles (n: 3~12) so as to reduce the contact area between the holding ring and the inner wall of the reaction tube.

The holding feet 6 are adapted to support the holding ring 5 and level it. The length and thickness of the holding feet 6 are not limited to a specific amount, but, considering catalyst filling, the thickness is preferably not too large.

The above-mentioned structure for guiding the installation of a thermowell for temperature sensor, alone or together with the holding structure, is applicable not only to a case in which a commercial multi-tubular reactor is filled with a catalyst, but also to a pilot- or laboratory-scale reactor tube. Typical examples of a process using such a commercial multi-tubular reactor include a process for manufacturing acrolein or acrylic acid by oxidizing propylene or propane, a process for manufacturing phthalic anhydride by oxidizing naphthalene or orthoxylene, and a process for manufacturing maleic anhydride by partially oxidizing benzene, butylene, or butadiene.

A method for installing a thermowell for temperature sensor according to the present invention includes a first step of installing a guide structure, which is adapted to guide the installation of a thermowell for temperature sensor, inside a reaction tube so as to fix a thermowell, which is used to measure the axial temperature, at a predetermined location inside a fixed-bed catalyst reaction tube and a second step of fixing the thermowell for temperature sensor while filling the reaction tube with a catalyst.

In the first step of the method, a holding structure may be installed inside the reaction tube together with the guide structure. The holding structure includes a holding ring fastened beneath a guide tube leg or support rod of the guide structure so as to hold it and at least three holding feet connected to the holding ring in the vertical direction so as to support it.

The maximum diameter of the holding ring of the holding structure must be smaller than the inner diameter of the reaction tube, but larger than the outer diameter of the thermowell for temperature sensor. Preferably, the maximum diameter of the holding ring is smaller than or equal to the horizontal maximum diameter of the guide structure.

The guide structure used in the method for installing a thermowell for temperature sensor according to the present invention may include a guide tube 1, a guide tube leg 2, and a support rod 3. Alternatively, the guide structure may include a guide tube 1, a guide tube leg 2, a ring 4, and a support rod 3.

The method may further include a third step of removing the guide structure from the reaction tube after the second step. Alternatively, when both a guide structure and a holding structure have been installed inside the reaction tube, the method may further include a third step of removing the guide structure and the holding structure from the reaction tube after the second step.

In the second step, the guide structure alone or together with the holding structure may be moved in the axial direction of the reaction tube according to the height of a catalyst-filled bed, which is created as a result of catalyst filling, so as to fix the thermowell and measure the height of the catalyst-filled bed. It is not always necessary to move the guide structure alone or together with the holding structure in the upward direction during the filling process. However, such a movement is advantageous in that the thermowell can be fixed at a predetermined location inside the reaction tube more efficiently. In addition, after the filling process is over, the guide structure alone or together with the holding structure can be easily removed.

Figure 8:
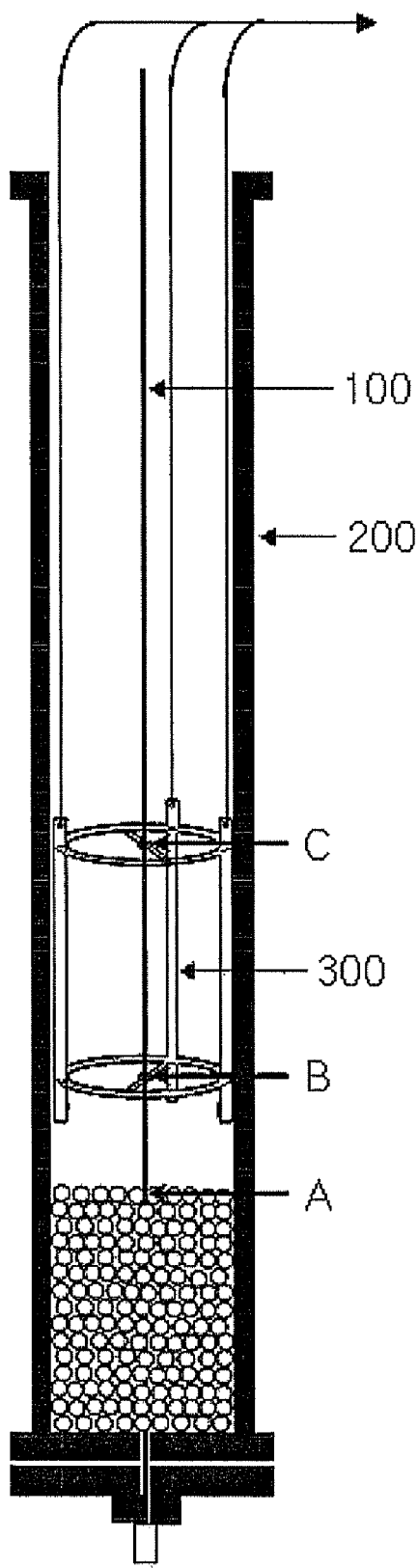
FIG. 8 shows a method for installing a thermowell for temperature sensor in a fixed-bed catalyst reaction tube by using the structure for guiding the installation of the thermowell for temperature sensor shown in FIG. 6 while filling the reaction tube with a catalyst.

FIG. 8 briefly shows a method for installing a thermowell for temperature sensor in a fixed-bed catalyst reaction tube by using the guide structure shown in FIG. 6 while filling the reaction tube with a catalyst.

An example of a method for installing a guide structure for guiding the installation of a thermowell for temperature sensor in a fixed-bed catalyst reaction tube is as follows: a weight is fitted on top of the guide structure, which is then inserted into the reaction tube. Due to the weight, the guide structure is easily moved into the reaction tube. The weight is removed before the reaction tube is filled with a catalyst.

Referring to FIG. 8, when the fixed-bed catalyst reaction tube 200 is filled with a catalyst, the guide structure 300 is moved in the axial direction of the thermowell for temperature sensor 100 while continuously fixing the location of the thermowell for temperature sensor 100 at three spots, particularly spot A on the catalyst bed and spots B and C on the guide tube. As such, the thermowell for temperature sensor is accurately fixed at a predetermined location inside the reaction tube.

Figure 9:
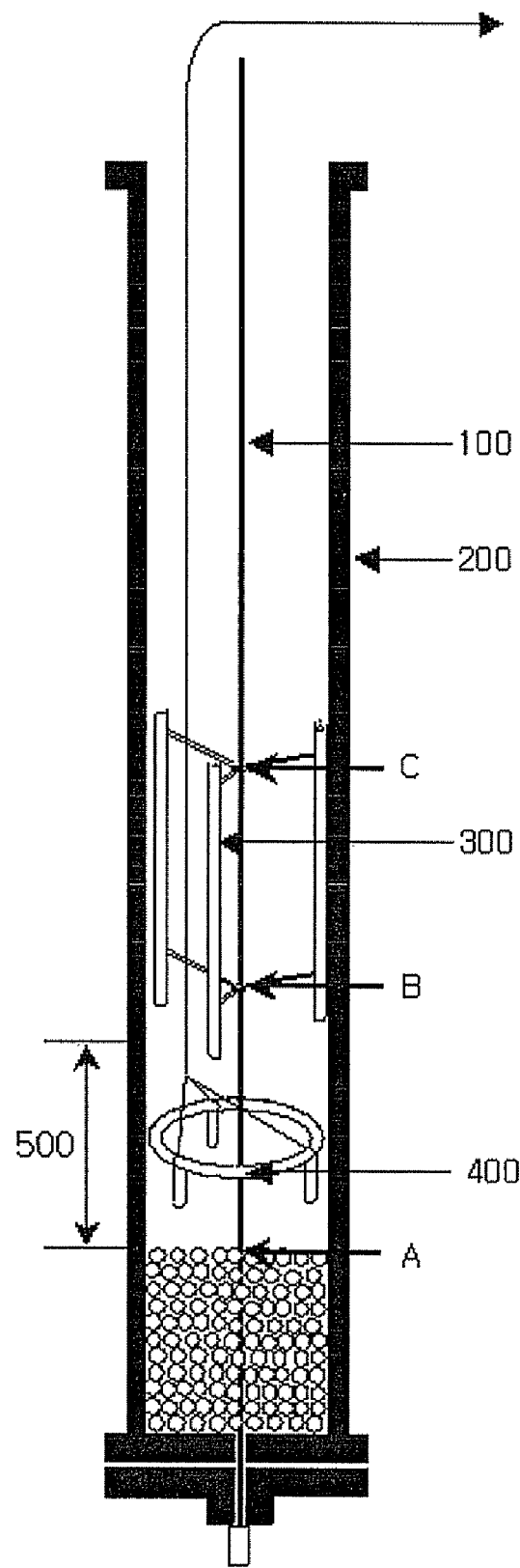
FIG. 9 shows a method for installing a thermowell for temperature sensor in a fixed-bed catalyst reaction tube by using the structure for guiding the installation of the thermowell for temperature sensor shown in FIG. 6 and the holding structure shown in FIG. 7 while filling the reaction tube with a catalyst.

FIG. 9 briefly shows a method for installing a thermowell for temperature sensor in a fixed-bed catalyst reaction tube by using the guide structure shown in FIG. 3 and the holding structure shown in FIG. 7 while filling the reaction tube with a catalyst.

The holding structure is used when the fixed-bed catalyst reaction tube has a small inner diameter or when the guide structure cannot be moved easily. By installing at least one wire, for example, on at least one portion of the holding structure and manipulating the wire from the outside of the reaction tube, the guide structure and the holding structure can be easily moved in the axial direction.

Referring to FIG. 9, when the fixed-bed catalyst reaction tube 200 is filled with a catalyst, the guide structure 300 and the holding structure 400 are moved in the axial direction of the thermowell for temperature sensor 100 while continuously fixing the location of the thermowell for temperature sensor 100 at three spots, particularly spot A on the catalyst bed and spots B and C on the guide tube. As such, the thermowell for temperature sensor is accurately fixed at a predetermined location inside the reaction tube.

Referring to FIG. 9, the holding structure 400 is fastened beneath the guide structure 300 and pulled so that these structures 300 and 400 are moved in the axial direction. When the fixed-bed catalyst reaction tube has a small inner diameter or when the guide structure cannot be moved easily, a wire, for example, is connected to the holding structure 400 and hung down so that the holding structure 400 moves downwards while the guide structure 300 remains at the same location. As a result, the distance 500 between the catalyst bed and the guide structure is known. In addition, the distance 500 between the catalyst bed and the guide structure is maintained uniformly so that the guide structure 300 is not embedded in the catalyst bed and the holding structure 400 is positioned on top of the catalyst bed. This informs of the filling level of the catalyst bed.

Those skilled in the art can easily understand that it is within the scope of the present invention to apply the structure for guiding the installation of a thermowell for temperature sensor, alone or together with the holding structure, to a predetermined length of tube, besides a thermowell for temperature sensor, when the tube is fixed at a predetermined location inside a reaction tube in the axial direction.

As can be seen from the foregoing, the structure for guiding the installation of a thermowell for temperature sensor according to the present invention is advantageous in that, when the structure is used while a fixed-bed catalyst reaction tube is filled with a catalyst, it is possible to maintain a constant density of the catalyst-filled bed and accurately position the thermowell for temperature sensor at a predetermined location. Therefore, the axial temperature profile of the catalyst-filled bed can be measured efficiently. In addition, the absence of fixed supports inside the reaction tube makes it easy to remove the catalyst from the reaction tube for replacement. Since the structure can be moved according to the height of the catalyst-filled bed during filling, the filling level of the bed is instantly known.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

What is claimed is:

1. A structure for guiding installation of a thermowell for temperature sensor, the structure comprising:
    a guide tube for fixing a location of the thermowell;
    at least two guide tube legs connected to the guide tube in a horizontal direction so as to support the guide tube; and
    support rods connected to the guide tube legs in a vertical direction so as to support the guide tube legs, respectively,
    wherein the at least two guide tubes are arranged in the vertical direction, and each guide tube is at an identical radial location from a center of a fixed-bed catalyst reaction tube; and
    each support rod comprises a support rod ear extending from an upper end to a portion connected to a highest guide tube leg, a support rod body extending from the portion connected to the highest guide tube leg to a portion connected to a lowest guide tube leg, and a support rod foot extending from the portion connected to the lowest guide tube leg to a lower end.

2. The structure as claimed in claim 1, wherein the structure is adapted to move in an axial direction of the fixed-bed catalyst reaction tube.

3. The structure as claimed in claim 1, wherein an identical number of guide tube legs are connected to each guide tube.

4. The structure as claimed in claim 1, wherein the number of the support rods is equal to the number of the guide tube legs connected to each guide tube, and each support rod is connected to the guide tube legs positioned along an identical axis from a highest location to a lowest location.

5. A structure for guiding installation of a thermowell for temperature sensor, the structure comprising:
    a guide tube for fixing a location of the thermowell;
    at least two guide tube legs connected to the guide tube in a horizontal direction so as to support the guide tube;
    a ring connected to the guide tube legs in the horizontal direction so as to support the guide tube legs; and
    at least two support rods connected to the guide tube legs or the ring in a vertical direction so as to support the guide tube legs or the ring.

6. The structure as claimed in claim 5, wherein the structure is adapted to move in an axial direction of a reaction tube.

7. The structure as claimed in claim 5, wherein at least two guide tubes are arranged in the vertical direction, and each guide tube is at an identical radial location from a center of a fixed-bed catalyst reaction tube.

8. The structure as claimed in claim 5, wherein the ring and a shell of the ring have a shape of a circle, an ellipse, or a polygon having n angles, n being 3~12, respectively.

9. The structure as claimed in claim 7, wherein each support rod is connected to the guide tube legs or the rings, the guide tube legs being positioned along an identical axis from a highest location to a lowest location.

10. The structure as claimed in claim 7, wherein each support rod comprises a support rod ear extending from an upper end to a portion connected to a highest guide tube leg or ring, a support rod body extending from the portion connected to the highest guide tube leg or ring to a portion connected to a lowest guide tube leg or ring, and a support rod foot extending from the portion connected to the lowest guide tube leg or ring to a lower end.

11. A holding structure comprising:
    a holding ring fastened beneath at least one guide tube legs/support rods of a structure for guiding installation of a thermowell for temperature sensor so as to hold the structure; and at least three holding feet connected to the holding ring in a vertical direction so as to support the holding ring, wherein the structure for guiding installation of a thermowell for temperature sensor comprises:

a guide tube for fixing a location of the thermowell; at least two guide tube legs connected to the guide tube in a horizontal direction so as to support the guide tube; and support rods connected to the guide tube legs in a vertical direction so as to support the guide tube legs, or a guide tube for fixing a location of the thermowell; at least two guide tube legs connected to the guide tube in a horizontal direction so as to support the guide tube; a ring connected to the guide tube legs in the horizontal direction so as to support the guide tube legs; and at least two support rods connected to the guide tube legs or the ring in a vertical direction so as to support the guide tube legs or the ring.

12. The holding structure as claimed in claim 11, wherein the holding ring has a maximum diameter smaller than or equal to a maximum horizontal diameter of the structure for guiding installation of a thermowell for temperature sensor.

13. A method for installing a thermowell for temperature sensor, the method comprising the steps of:

(a) installing a guide structure, the guide structure guiding installation of a thermowell for temperature sensor, inside a reaction tube so that the thermowell for axial temperature measurement is fixed at a predetermined location inside the reaction tube and (b) fixing the thermowell for temperature sensor while filling the reaction tube with a catalyst, wherein the guide structure comprises:

a guide tube for fixing a location of the thermowell; at least two guide tube legs connected to the guide tube in a horizontal direction so as to support the guide tube; and support rods connected to the guide tube legs in a vertical direction so as to support the guide tube legs, respectively, wherein the at least two guide tubes are arranged in the vertical direction, and each guide tube is at an identical radial location from a center of a fixed-bed catalyst reaction tube; and each support rod comprises a support rod ear extending from an upper end to a portion connected to a highest guide tube leg, a support rod body extending from the portion connected to the highest guide tube leg to a portion connected to a lowest guide tube leg, and a support rod foot extending from the portion connected to the lowest guide tube leg to a lower end, or wherein the guide structure comprises:

a guide tube for fixing a location of the thermowell; at least two guide tube legs connected to the guide tube in a horizontal direction so as to support the guide tube; a ring connected to the guide tube legs in the horizontal direction so as to support the guide tube legs; and at least two support rods connected to the guide tube legs or the ring in a vertical direction so as to support the guide tube legs or the ring.

14. The method as claimed in claim 13, wherein, in step (a), a holding structure is installed inside the reaction tube together with the guide structure, and the holding structure comprises a holding ring fastened beneath at least one guide tube legs/support rods of the guide structure so as to hold the guide structure; and at least three holding feet connected to the holding ring in a vertical direction so as to support the holding ring.

15. The method as claimed in claim 13, further comprising a step of removing the guide structure from the reaction tube after step (b).

16. The method as claimed in claim 14, further comprising a step of removing the guide structure and the holding structure from the reaction tube after step (b).

17. The method as claimed in claim 13, wherein, in step (b), the guide structure is moved in an axial direction of the reaction tube according to a height of a catalyst-filled bed while filling the reaction tube with a catalyst so as to fix the thermowell and measure the height of the catalyst-filled bed.

18. The method as claimed in claim 14, wherein, in step (b), the guide structure and the holding structure are moved in an axial direction of the reaction tube according to a height of a catalyst-filled bed while filling the reaction tube with a catalyst so as to fix the thermowell tube and measure the height of the catalyst-filled bed.

* * * * *